Oct. 22, 1968     D. A. DRAUDT ET AL     3,406,429
THERMO-PLASTIC MOLDING MACHINE WITH
FLOATING SCREW SPREADER

Filed May 19, 1966                                           4 Sheets-Sheet 1

INVENTORS
HERBERT DRAUDT
DONALD A. DRAUDT
BY
Bosworth, Sessions,
Herstein & Knowles
ATTORNEYS Oct. 22, 1968

D. A. DRAUDT ET AL
THERMO-PLASTIC MOLDING MACHINE WITH
FLOATING SCREW SPREADER 3,406,429

Filed May 19, 1966

INVENTORS
HERBERT DRAUDT
DONALD A. DRAUDT
BY Bosworth Sessions
Hairston & Knowles
ATTORNEYS

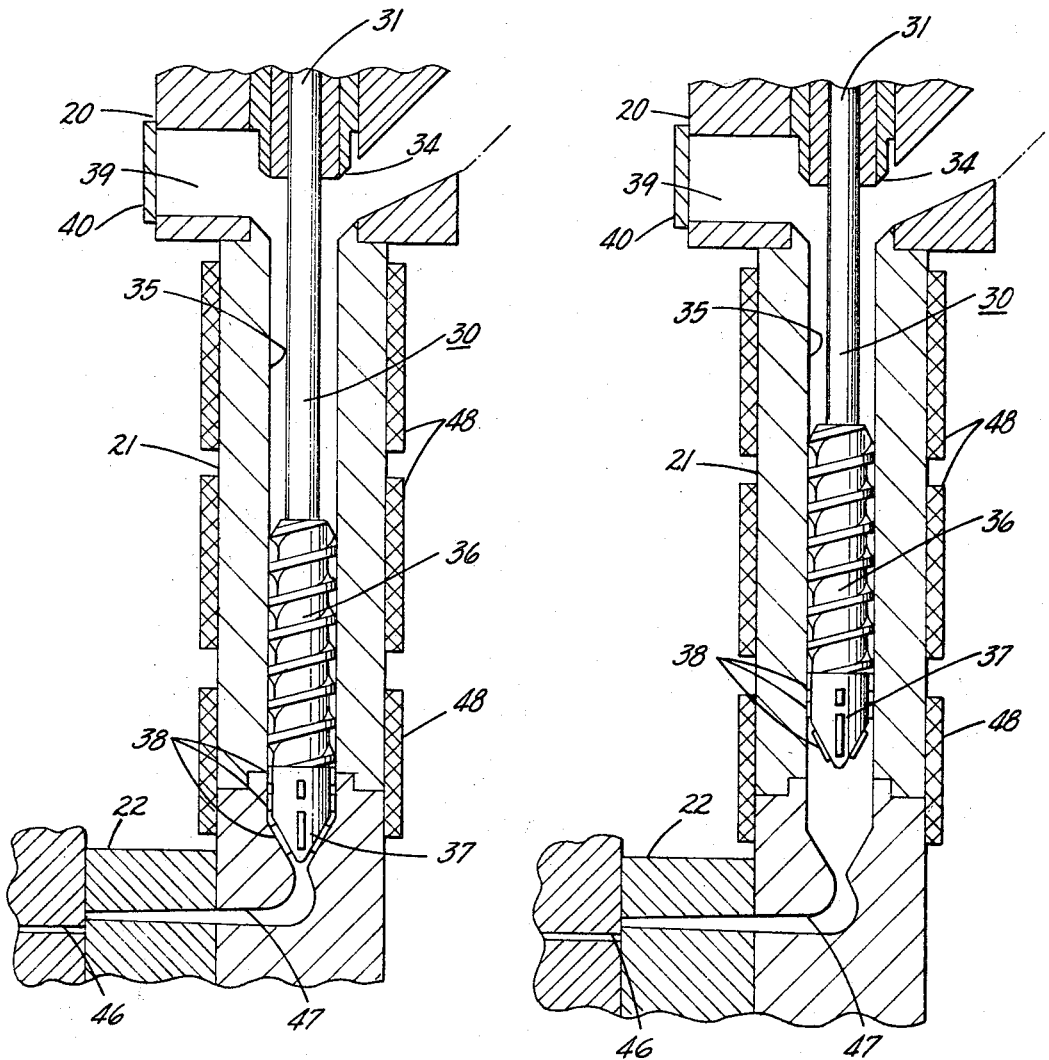

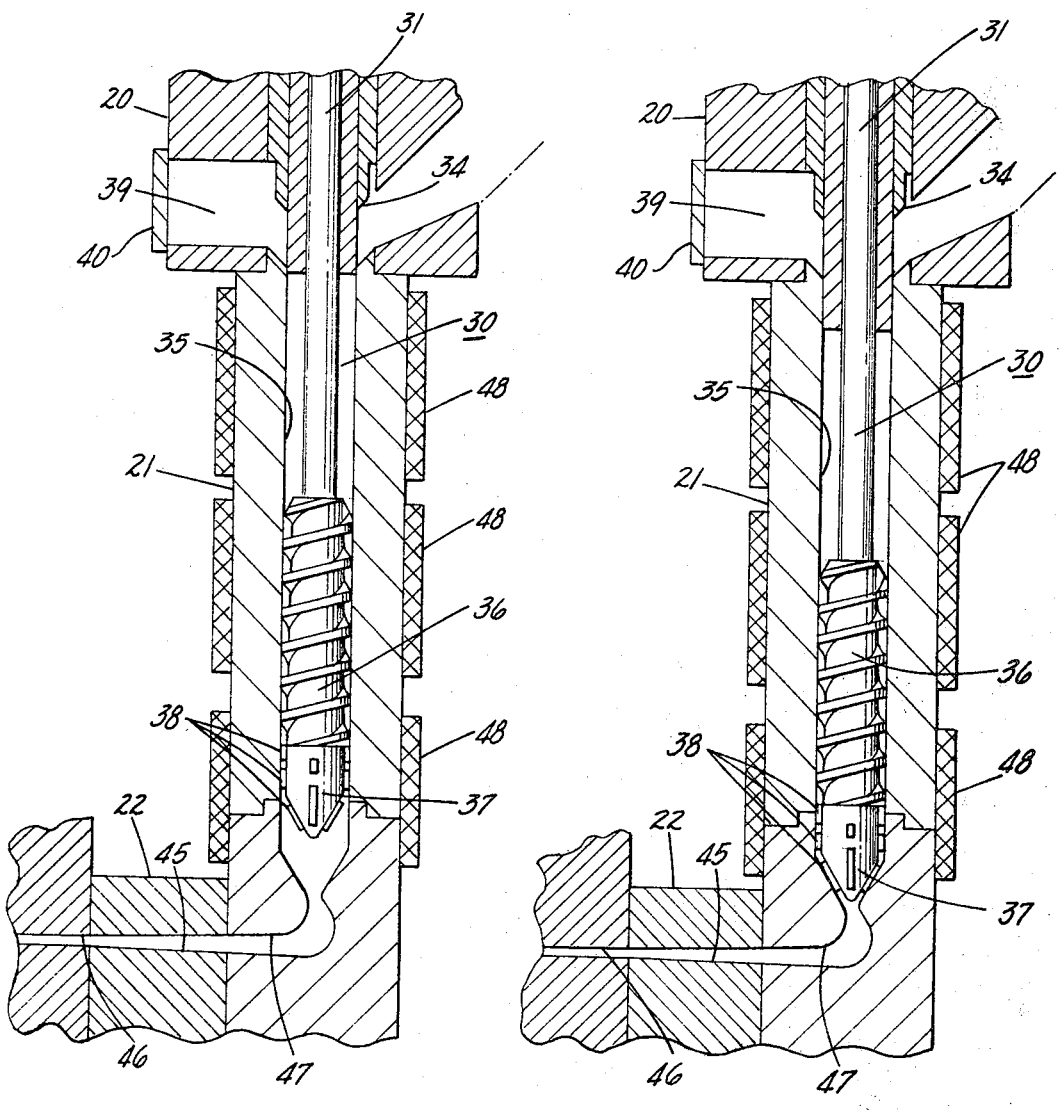

United States Patent Office 3,406,429
Patented Oct. 22, 1968

3,406,429
THERMO-PLASTIC MOLDING MACHINE WITH
FLOATING SCREW SPREADER
Donald A. Draudt, 27180 Pompton Drive, and Herbert T.
Draudt, 28520 Lynhaven, both of North Olmsted,
Ohio 44070
Filed May 19, 1966, Ser. No. 551,386
7 Claims. (Cl. 18—30)

This invention relates to injection molding machinery for the production of molded plastic articles.

More particularly our invention relates to an improved machine for plasticizing moldable material and injecting a measured charge thereof into a mold cavity.

Injection molding machines are used to form many types of plastic materials, especially thermoplastics such as nylon, polyethylene, vinyl, styrene, polyurethane, "Delrin" and acetate. Where thermoplastics are used, the machine can be cycled as fast as the material can be heated and plasticized in the cylinder and a measured charge thereof positioned for injection. Operating limitations are largely those imposed by the molds themselves. Fast cycling is particularly desirable in order to avoid overheating and charring, or heating of portions or zones of material for an excessive period of time sufficient to cause decomposition.

Means for obtaining this result, however, have not been satisfactory in the prior art practices for several reasons.

In many cases rapid cycling of the injection molding equipment fails to achieve complete and/or homogeneous mixing of the plastic material prior to injection so that the resulting molded product tends to have an uneven texture and/or appearance. Also the injection mechanism does not remove all of the material in the charging end or forward end of the cylinder during the molding cycle. As a result, residual material may remain in the cylinder in a heated condition for a time period that may exceed its physical limits and may become charred, or in some cases decomposed. As a result frequent cleaning of the cylinder bore is required, or the faulty material flakes off and gets into the molded product.

Some current and prior injection molding machines utilize a rotating and reciprocating screw with complicated valving at the forward end which operates during the injection and retraction movements. Such valving permits forward movement of the material in the cylinder during retraction of the piston or screw but closes to prevent rearward movement of material during the injection stroke. The use of such valves further complicates the problem of cleaning the cylinder and increases the possibility of malfunction of the machine. Also, due to the viscosity of the plasticized material the opening and closing is relatively sloppy and cannot be relied upon to provide a measured charge for injection.

An additional drawback of the rotating and reciprocating screw type machines is that the shaft of the screw is at times caused to flex or bend due to the high pressures generated during the injection stroke. The flexing occurs when a force is applied to the rearward end of the screw shaft to force the screw axially forward against the plasticized material to be injected. This affects the operation of the machine adversely and tends to cause breakage.

Another objectionable feature of prior equipment is that excessive pressures maintained on the plastic material in the mold after it is filled causes undesirable internal stresses in the molded product. While a high injection pressure is needed during most of the injection stroke in order to overcome the viscosity resistance of the material and to compensate for shrinkage in the mold, once the mold is filled, pressure in excess of that needed to offset shrinkage tends to result in flash as well as deleterious stress in the product. Some prior techniques for reducing the pressure in the mold at and/or near the end of the injection stroke, have required complex pressure sensing devices and valve actuated pressure release mechanisms, and have not been effective nor free from wear and trouble.

The apparatus of our invention overcomes the objections mentioned above and affords other features and advantages heretofore long desired, but not obtained.

The preferred embodiment of our invention provides a plasticizing cylinder having a bore with an input or rearward end, and an injection, or forward, end. Mounted for free axial movement in the bore of the cylinder is a rotatable member having a screw portion intermediate its ends. A rotary drive means slidably engages the rotary member to permit free axial movement of the member during its rotation as well as during periods of non-rotation. Also mounted within the cylinder bore is a plunger which is mounted for reciprocating movement within and adjacent the input end of the bore in the space between the wall of the bore and the rotary member. The plunger serves both to close the inlet to the bore and to press the plastic material confined in the bore along with the rotatable member, axially forward toward the injection end of the bore to force material out of the injection nozzle, the plunger being reciprocated by a suitable drive means.

In one embodiment of our invention the mechanism described above is used in connection with an injection apparatus having means for moving the injection nozzle into and out of communication with the mold sprue, the means being the same as that used to reciprocate the plunger.

According to another aspect of our invention the rotatable member includes in addition to the screw portion, a mixing head at the forward end thereof which has longitudinal ribs serving to homogenize a measured charge of plastic material at the forward end of the cylinder bore and which bottoms at the end of the bore near the end of the injection stroke so that the injection pressure is substantially reduced at and beyond the end of the bore, in anticipation of any flash from the mold. The ribs are adapted to engage the end walls of the cylinder bore during rotary movement of the mixing head, and thus tend to remove or move residual plasticized material from the walls after each injection stroke.

It is among the objects of our invention to provide a new and improved injection molding apparatus which affords a more effective heating and mechanical working of the molding material and improved control of pressure, volume and temperature of the injected material.

Another object of our invention is to provide an injection molding apparatus which rapidly and positively fills the mold with homogeneously mixed plasticized material and then maintains an advantageously reduced holding pressure on the injected material while the material shrinks and solidifies in the mold. Similarly, it is among our objects to avoid flash from the mold, and avoid harmful compression stresses in the injected material in the mold.

Another object of our invention is to avoid the use of valving of any type in the reciprocating injection mechanism within the cylinder.

A further object of our invention is to remove residual material from the forward end of the injection cylinder during each cycle to prevent overheating and charring of the plasticized material.

Other objects of our invention are to provide an accurate and readily adjustable measure of the plasticized charge of material to be injected into the mold, to remove air from unplasticized material in the cylinder, to avoid flexing or excessively stressing of the screw shaft and take better and/or exclusive advantage of the screw in its functions of mixing and measuring the material to be injected.

Other objects, uses and advantages of our invention will become apparent from the following detailed description of a preferred form, reference being had to the accompanying drawings wherein:

FIGURE 4 is a fragmentary cross-sectional view taken on the line 4—4 of FIGURE 1 showing the rotary member of the apparatus in its forward position following an injection stroke and the cylinder and nozzle lifted out of communication with the mold sprue;

FIGURE 5 is a fragmentary sectional view similar to FIGURE 4 showing the rotary member of the apparatus in its rearward position preparatory to an injection stroke; and FIGURE 6 is a fragmentary sectional view similar to FIGURES 4 and 5 showing the condition of the apparatus during an injection stroke; and FIGURE 7 is a fragmentary sectional view similar to FIGURES 4, 5 and 6 showing the forward end of the rotary member bottomed against the end of the cylinder and the plunger in its most forward position during the final portion of an injection stroke.

*The apparatus*

Figure 1:
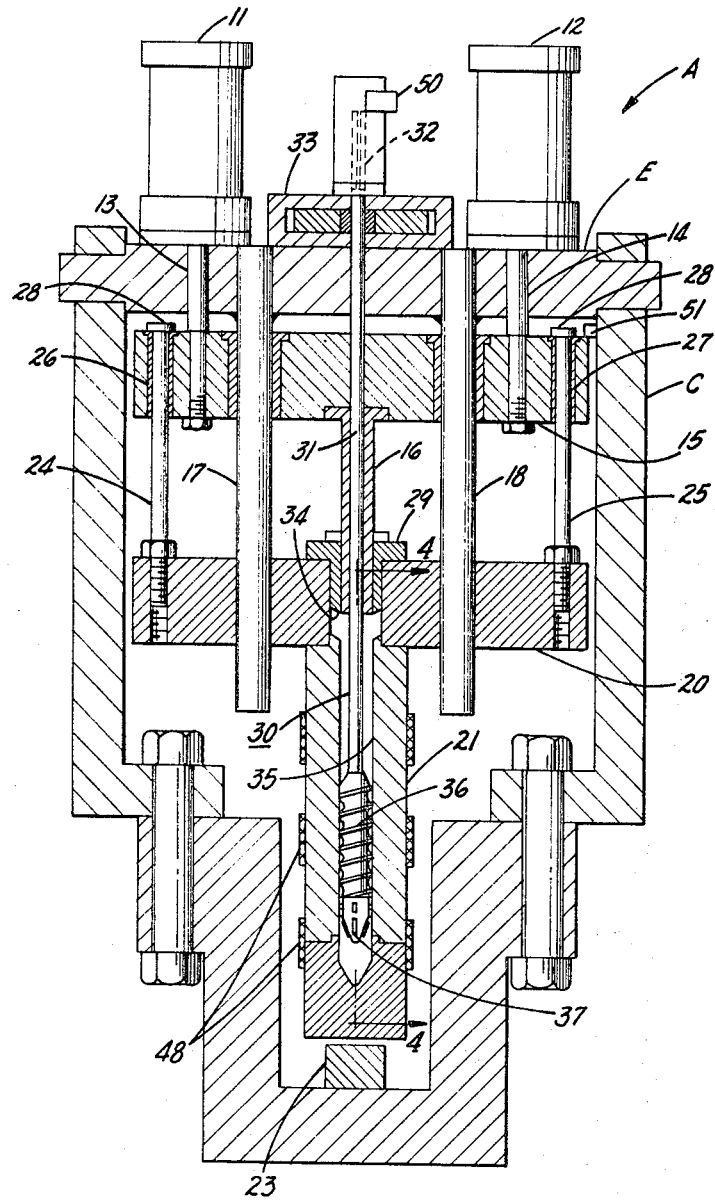
FIGURE 1 is a sectional view taken through the center of an injection molding apparatus embodying the invention.
Figure 2:
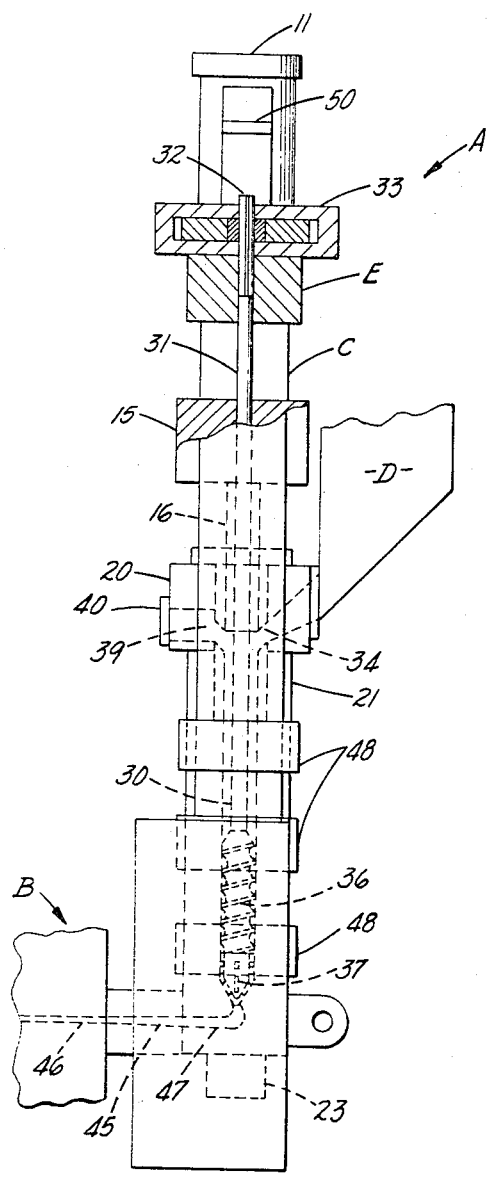
FIGURE 2 is a side elevational view of the apparatus of FIGURE 1 with parts broken away and shown in section, the plunger carrier plate being shown in its downward position at the end of an injection stroke.
Figure 3:
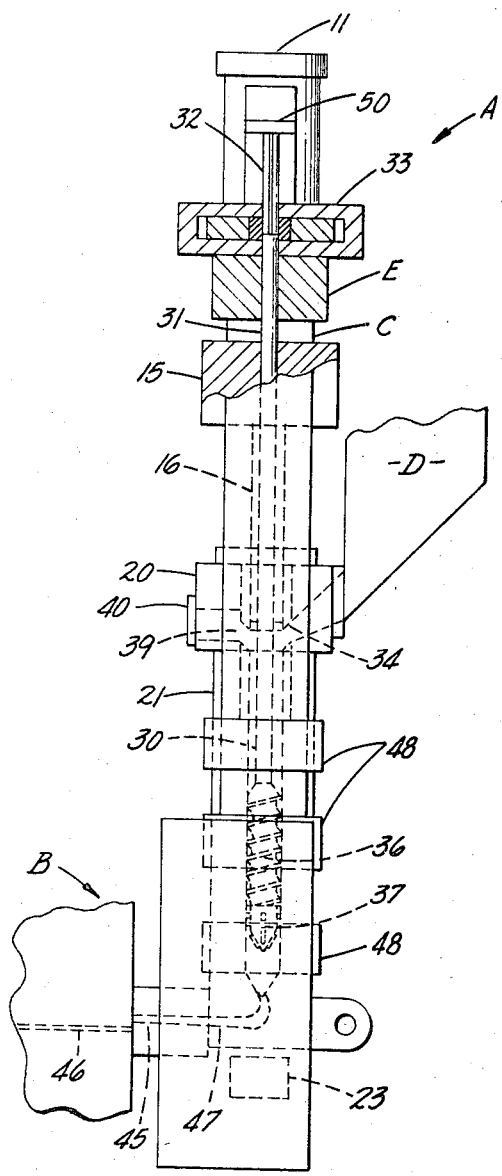
FIGURE 3 is a side elevational view similar to FIGURE 2 with parts broken away and shown in section, the plunger carrier plate being shown in its uppermost position, and the rotary member in its most rearward position preparatory to an injection stroke.

Referring more particularly to the drawings there is shown an injection molding apparatus A embodying the invention, and adapted for use in connection with a closed-die mold B best shown in FIGURES 2 and 3. The apparatus A includes a frame C, a feed-hopper D mounted on the frame C, and a cross-member E. The cross-member E supports the working parts of the apparatus and has bearings provided at its opposite ends which are carried in the frame C so that it is capable of pivotal movement. This method of mounting facilitates cleaning of the equipment and changing of parts.

Mounted on the cross-member E are two hydraulic cylinders 11 and 12 having piston rods 13 and 14 extending downwardly through the cross-member. Connected to the piston rods 13 and 14 is a plunger carrier plate 15 which carries a tubular injection plunger 16. The plunger carrier plate 15 is guided for reciprocating movement by guide rods 17 and 18 which are mounted in fixed position on the cross-member E. Mounted below the plunger carrier plate 15 is a cylinder carrier plate 20 which is guided for reciprocating movement on the guide rods 17 and 18 and which supports a plasticizing cylinder 21 having an injection nozzle 22 at its lower end. The cylinder carrier plate 20 is effective to move the plasticizing cylinder 21 and the injection nozzle 22 between the positions shown in FIGURE 2 wherein the bottom of the cylinder 21 rests on a block 23 mounted at the bottom of frame C, and a position wherein the cylinder 21 and injection nozzle 22 are lifted upward to bring the nozzle 22 out of communication with mold sprue as will be more particularly described below.

Movement of the plasticizing cylinder 21 is accomplished by means of lifter rods 24 and 25 mounted at opposite ends of the cylinder carrier plate 20. The lifter rods 24 and 25 extend upwardly from the cylinder carrier plate 20 and through bushings 26 and 27 located in the plunger carrier plate 15. The upper ends of the lifter rods 24 and 25 have a radial flange 28 which overlies the top surface of the plunger carrier plate 15 so that during the terminal portion of the upward movement of the plunger carrier plate 15 the lifter rods 26 and 27 are pulled upwardly to raise the cylinder carrier plate 20 together with the plasticizing cylinder 21.

Mounted on the cylinder carrier plate 20 above the plasticizing cylinder 21 is a guide bushing 29 which receives the tubular injection plunger 16 and guides its reciprocating movement. The bushing 29 also serves to close the upper end of the plasticizing cylinder 21.

Mounted for free axial movement within the plasticizing cylinder 21 is a rotary member 30 having a shaft 31 which extends upwardly from the plasticizing cylinder 21, through the tubular injection plunger 16, and through the plunger carrier plate 15 and cross-member E. The outer end 32 of the shaft 31 is splined and is engaged by a rotary hydraulic drive unit 33. The splined outer end 32 is so designed that the rotary member 30 is capable of free axial movement during operation of the rotary drive. Located at the lower end of the rotary member 30 within the bore 35 of the plasticizing cylinder 21 is a screw portion 36 having a minor diameter which increases gradually from rear to front as best shown in FIGURES 4 through 7. At the lower end of the rotary member 30 adjacent the screw portion 36 is a mixing head 37 having radially extending ribs 38.

The plastic material to be molded is supplied in dry solid form such as powder or granules to the cylinder bore 35 from the hopper D by means of an annular inlet port 34 formed in the cylinder carrier plate 20 between the upper end of the plasticizing cylinder 21 and the guide bushing 29. During the operation of the equipment the tubular injection plunger 16 moves downwardly into the cylinder bore 35 and closes off the feed port 34 as best shown in FIGURES 6 and 7.

On the side of the cylinder carrier plate 20 opposite the hopper D is a clean-out space 39 normally covered by a plate 40. The space 39 communicates with the bore of the plasticizing cylinder so that the upper end of the bore and the port may be periodically cleaned when desired.

It will be noted that the rotary member 30, the tubular injection plunger 16 and the plasticizing cylinder 21 are all movable linearally relative to one another. Reciprocating movement of the plasticizing cylinder 21 and attached injection nozzle 22 between the position shown in FIGURES 4 and 5 and the position shown in FIGURES 6 and 7 is provided for by means of the lifter rods 24 and 25 as described above.

When the nozzle is in the position shown in FIGURES 6 and 7, the port 45 of the nozzle communicates with the sprue 46 of the mold. The nozzle port 45 communicates with the lower end of the cylinder bore 35 by means of a passage 47 formed in the plasticizing cylinder 21 to permit plasticized material to flow from the bore to the nozzle and then into the mold cavity. The flow of fluid from the nozzle to the mold may be interrupted during the molding cycle by lifting the plasticizing cylinder 21 and nozzle 22 upward to the position shown in FIGURES 4 and 5. In this position the mold block seals the nozzle port 45 and prevents escape of material.

Movement of the tubular injection plunger 16 between the position shown in FIGURES 4 and 5 that shown in FIGURE 7, is accomplished by means of the plunger carrier plate 15 and the hydraulic cylinders 11 and 12.

Axial movement of the rotary member 30 is accomplished by two independent means. With reference to FIGURES 4 and 5, the rearward movement of the member 30 from the position shown in FIGURE 4 to the position shown in FIGURE 5 is accomplished by rotating the member counter-clockwise in a manner tending to move the screw portion 36 rearwardly relative to the cylinder bore 35 and to push material forwardly from rearward of the screw portion 36 to the mixing head 37. During this rotary movement dry solid material entering through the inlet port 34 is fed forwardly by the screw threads. Because the minor diameter of the screw portion increases gradually from rear to front the dry material is eventually compacted and squeezed outwardly against the inner wall of the bore 35 as it reaches the lower end of the screw portion 36, the mixing head 37 serving to further mix and homogenize the material. Sufficient clearance is provided between the screw threads and the wall of the bore that material which is squeezed between the threads and the bore will not absorb too much heat and be charred. A clearance of about .06 inch has been found suitable for many applications.

Both the plasticizing cylinder 21 and the nozzle 22 are heated by an external electrical heating jacket 48 during the operation of the equipment to provide desired plasticizing temperatures as is well known in the art.

The rotary movement of the screw portion 36 develops a pressure differential between the plasticized material at the forward end of the bore and the material rearward of the screw threads so that the rotary member 30 is forced rearwardly to the position shown in FIGURE 5. In this position a measured charge of plasticized material is located in the space forward of the mixing head. The volume of this space may be adjusted by limiting the upward movement of the rotary member. Operation of the rotary drive unit 33 is stopped in response to actuation of a limit switch 50 which is engaged by the outer end 32 of the shaft 31 after the rotary member has been lifted to the desired height as shown in FIGURE 5.

Downward movement of the rotary member 30 is accomplished by means of the tubular plunger 16 which presses against the material at the upper end of the cylinder bore 35 adjacent the inlet port 34 and forces both the material and the rotary member 30 downwardly through the bore. This serves to force plasticized material located at the lower end of the bore outwardly through the passage 47 and the nozzle port 45 into the mold B through the mold gate 46.

The mixing head 37 bottoms against the lower end of the cylinder bore 35 as shown in FIGURE 7, however the ribs 38 keep the body portion of the mixing head 37 from closing the outlet passage 47 in the cylinder and the fluid pressure developed in the material in the mold cavity is relieved and balanced against the reduced fluid pressure of the material in the cylinder 21. The tubular plunger 16 travels slightly in its downward direction even after the mixing head bottoms so that some material is squeezed in a helical path of travel through the roots of the screw portion 36.

Because the fluid pressure in the mold cavity is relieved somewhat after the mixing head bottoms, overstressing of the plastic material in the mold cavities is prevented although sufficient pressure is maintained by the plunger 16 to compensate for shrinkage as the material cools. Also the engagement of the lower end of the cylinder bore 35 by the ribs 38 of the mixing head 37 of the stroke enables the ribs to wipe residual material from the lower surface of the bore when rotation of the rotary member is begun preparatory to its retraction movement. This prevents the decomposition of the residual material which would otherwise result due to the high temperatures maintained in the cylinder wall by the external heating jacket 48. The lower limit of downward travel of the injection plunger 16 is variable and depends upon the back pressure developed by the material in the bore 35. The hydraulic cylinders at 11 and 12 develop consistent pressures during each stroke regardless of the position of the plunger 16.

The cylinders 11 and 12 are actuated to pull the plunger 16 upwardly out of the cylinder bore to the position shown in FIGURE 4, shortly after the mixing head 37 bottoms. During the last portion of the upward movement of the plunger the radial flanges 28 at the ends of the lifter rods 24 and 25 are engaged by the plunger carrier plate 15 to lift the plasticizing cylinder 21 and injection nozzle 22 out of communication with the mold sprue 46 and prevent the flow of material in either direction.

As the plunger carrier plate 15 reaches the upper limit of its travel it actuates a limit switch 51 mounted on the frame C which starts operation of the rotary drive unit 33 after a pre-set time delay.

*Operation*

The operating cycle of the injecting molding apparatus shown and described may be best understood by reference to FIGURES 4 to 7. Before the equipment is used in connection with a specific mold and a specific material, the timing between the various portions of the cycle and the stroke lengths of the plunger 16 and the rotary member 30 should be carefully adjusted. The dwell time in which the mold B remains closed after the plastic material has been injected should be sufficient to permit suitable cooling of the material. Also the time period between thrust and retraction movements of the hydraulic cylinders 1 and 2 must be carefully adjusted. Additionally the temperatures maintained by the heating jacket 48 of the plasticizing cylinder and injection nozzle should be adjusted for the particular plastic material being used and should be very carefully thermostatically controlled.

Considering the cycle as beginning with the apparatus in the condition shown in FIGURE 4, the nozzle being out of communication with the mold sprue, the rotary drive unit 33 for the rotary member 30 is actuated, usually by a control system utilizing timers to coordinate the cycle with the opening and closing of the mold. As the screw portion 36 of the rotary member 33 is forcibly rotated, the material is homogenized, compacted in the roots of the threads and eventually forced to the forward space of the cylinder bore 35. As material in plasticized form advances forwardly of the screw portion 36 it is further mixed and homogenized by the ribs 38 formed on the mixing head 37. As the material is compacted, squeezed and homogenized, more material is drawn in through the inlet port 34 at the upper end of the cylinder from the hopper D.

Due to the compaction and squeezing of the material, several revolutions of the rotary member are normally required for the member to move axially the equivalent of one pitch length, the rearward movement being primarily dependent upon the difference in pressure between the material rearward of the screw portion and the material in the forward end of the bore.

After the rotary member has been raised to a pre-set upper limit such as shown in FIGURE 2, the limit switch 50 is actuated to stop the rotary drive unit 33. The hydraulic cylinders 11 and 12 are then actuated and begin to force the plunger carrier plate 15 downward. The initial portion of this downward movement lowers the cylinder carrier plate 20 until the bottom of the plasticizing cylinder 21 engages the block 23. This moves the nozzle port 45 into comunication with the mold sprue 46 to permit the plasticized material to flow from the space in the forward end of the cylinder bore 35 to the mold cavity. As indicated above a measured charge of plasticized material is at this point located in the forward space of the cylinder bore 35. The downward movement of the plunger carrier plate 15 and the injection plunger 16 is continued as shown in FIGURE 6 and the inlet port 34 is closed. The pressure being exerted against the material rearwardly of the screw portion 36 is effective to drive the rotary member 30 downwardly along with the plunger 16. This serves to force the measured charge of plasticized material out of the forward space and into the mold cavity. Toward the end of the injection stroke the ribs 38 of the mixing head 37 bottom against the forward end surface of the cylinder bore 35. The downward movement of the plunger 16 however tends to continue until the pressure exerted on the plunger carrier plate is counter balanced by the pressure of the plastic material rearwardly of the screw portion 36 of the rotary member 30. When these pressures equalize, the downward stroke of the plunger is stopped. Since the lower end of the mixing head is bottomed against the end of the cylinder bore the pressure in the material is reduced as the filling of the mold cavity is completed and as the material cools and shrinks. The time period in which the apparatus remains in this condition is preferably controlled by a timer and is dependent primarily on the particular material being used.

After a suitable time delay the hydraulic cylinders 11 and 12 retract the injection plunger 16 from the cylinder bore 35. This movement of the piston rods 13 and 14 serves two purposes as indicated above. In addition to retracting the plunger 16 from the cylinder bore 35 and opening the inlet port 34, the plasticizing cylinder 21 and the nozzle 22 are raised relative to the mold to the position shown in FIGURE 4. With the equipment in this condition the rotary drive unit 33 having been actuated by the limit switch 51, after a pre-set time delay, turns the rotary member 30 to feed a new measured charge of plasticized material into the forward space of the cylinder bore as described above. Then the mold may be opened to remove the molded part. Once the measured charge has been provided the mold is closed and the cylinder nozzle dropped into the position shown in FIGURE 2 so that another injection stroke may be commenced.

It will be understood that our invention has been shown and described with reference to a preferred embodiment thereof which is intended for the purpose of illustration rather than limitation, and that variations and modifications will be apparent to those skilled in the art within the intended spirit and scope of our teaching, wherefor we do not want our patent to be limited to the form or forms of method or apparatus herein specifically illustrated and described nor in any manner inconsistent with the progress by which the art has been promoted by our invention.

We claim:

1. Apparatus for injecting plastic material into a mold comprising a plasticizing cylinder having a bore with a rearward feed end and a forward outlet end, a rotatable member mounted for free axial movement and having a screw portion adapted to work plastic material in said bore, means for turning said rotatable member in a manner tending to screw said member axially rearwardly through said material in said bore, a plunger mounted for reciprocating movement relative to said bore and said member, adjacent the feed end of said bore, and adapted to push plastic material forwardly in said bore and induce said screw portion to move forwardly with said material toward the outlet end of said bore, and means for reciprocating said plunger in said bore.

2. An apparatus as defined in claim 1 wherein said rotatable member includes a mixing head forwardly of said screw portion, said mixing head having ribs which bottom against the outlet end of said bore whereby space is provided to permit a limited flow of material from the outlet end of said bore when said mixing head is bottomed.

3. An apparatus as defined in claim 1 including an injection nozzle mounted on said cylinder and adapted to engage a mold sprue, said nozzle having a port communicating with the outlet end of said bore, said cylinder and nozzle being adapted for reciprocating movement between a position wherein said port communicates with said mold sprue and a position wherein said port is sealed by a surface of said mold, said cylinder and nozzle being reciprocated by said means for reciprocating said plunger in said bore.

4. Apparatus as defined in claim 3 wherein said means for reciprocating said plunger and said plasticizing cylinder comprises a first slidable member carrying said cylinder and biased to a position wherein said nozzle port communicates with said mold sprue, a second slidable member carrying said plunger and located rearwardly of said first member, connecting means mounted on said first member and extending through said second member, said connecting means being slidable relative to said second member and having an enlarged outer end portion adapted to engage said second member and at least one hydraulic cylinder having a reciprocating piston rod connected to said second member to operate said plunger whereby during rearward movement of said plunger, said second slidable member engages said enlarged portion of said connecting means and carries said first slidable member and said cylinder and nozzle rearwardly to move said nozzle to a position wherein said nozzle port is sealed by said mold.

5. An apparatus as defined in claim 1 including means responsive to said rearward motion of said member to stop the turning thereof.

6. An apparatus as defined in claim 1 including means responsive to said rearward motion of said member to initiate forward movement of said plunger.

7. An apparatus as defined in claim 1 including means associated with the forward end of said rotary member for throttling the outflow of material from the cylinder when the mold cavity is substantially filled with the injected material.

References Cited

UNITED STATES PATENTS

| 3,045,283 | 7/1962 | Keiser | 18—30 |
| 3,140,332 | 3/1964 | Brown | 264—329 |
| 3,319,297 | 5/1967 | Garvin et al. | 18—30 |

FOREIGN PATENTS

| 1,088,704 | 9/1960 | Germany. |
| 384,182 | 4/1963 | Japan. |

WILBUR L. McBAY, *Primary Examiner.*